(12) United States Patent
Petiot et al.

(10) Patent No.: US 10,029,441 B2
(45) Date of Patent: Jul. 24, 2018

(54) ENERGY ABSORPTION DEVICE FOR AIRCRAFT STRUCTURAL ELEMENT

(71) Applicant: EUROPEAN AERONAUTIC DEFENCE AND SPACE COMPANY EADS FRANCE, Paris (FR)

(72) Inventors: Caroline Petiot, Les Ulis (FR); Michel Bermudez, Suresnes (FR); Didier Mesnage, Saint-Cloud (FR)

(73) Assignee: AIRBUS, Blagnac (FR)

( * ) Notice: Subject to any disclaimer, the term of this patent is extended or adjusted under 35 U.S.C. 154(b) by 304 days.

(21) Appl. No.: 14/655,303

(22) PCT Filed: Dec. 16, 2013

(86) PCT No.: PCT/EP2013/076754
§ 371 (c)(1),
(2) Date: Jun. 24, 2015

(87) PCT Pub. No.: WO2014/102085
PCT Pub. Date: Jul. 3, 2014

(65) Prior Publication Data
US 2015/0353185 A1    Dec. 10, 2015

(30) Foreign Application Priority Data

Dec. 27, 2012  (FR) ..................... 12 62896

(51) Int. Cl.
*B32B 5/24* (2006.01)
*B23P 15/00* (2006.01)
(Continued)

(52) U.S. Cl.
CPC .............. *B32B 5/245* (2013.01); *B23P 15/00* (2013.01); *B32B 1/00* (2013.01); *B64C 3/28* (2013.01);
(Continued)

(58) Field of Classification Search
CPC ................. B23P 15/00; B23P 2700/01; B32B 2262/0269; B32B 2262/106;
(Continued)

(56) References Cited

U.S. PATENT DOCUMENTS

| | | | | |
|---|---|---|---|---|
| 2,693,922 A | * | 11/1954 | Ellison | B64C 3/00 114/357 |
| 4,667,906 A | * | 5/1987 | Suarez et al. | B64C 3/28 244/117 A |
| 4,806,077 A | * | 2/1989 | Bost | B64C 27/473 416/144 |
| 4,935,277 A | | 6/1990 | Le Balc'h | |

(Continued)

FOREIGN PATENT DOCUMENTS

DE  10 2005 019455 A1  10/2006
EP     0 296 964 A1    12/1988

OTHER PUBLICATIONS

Forte Carbon Fiber Products, "Carbon Fiber Technology," 3 Pages <http://fortecarbon.com/technology/> retrieved Dec. 27, 2017 via archive.org (captured Nov. 14, 2012).*

*Primary Examiner* — Jacob Cigna
(74) *Attorney, Agent, or Firm* — Im IP Law; C. Andrew Im

(57) ABSTRACT

A device for absorbing kinetic energy for an aircraft structural element undergoing a dynamic impact. The device includes an outer enclosure made from a braided composite material configured to preserve its integrity after an impact, and a foam core contained in the outer enclosure and to at least partially fill the outer enclosure. The foam core configured to at least partially absorb the kinetic energy generated by the impact. Reinforcing elements include at least one dry composite fiber preform integrated into the foam core to dissipate, in combination with the foam core, the kinetic energy generated by the impact. A method for integrating the device for absorbing kinetic energy.

11 Claims, 2 Drawing Sheets

(51) Int. Cl.
*B64C 3/28* (2006.01)
*B64C 11/20* (2006.01)
*B64C 27/473* (2006.01)
*F41H 5/04* (2006.01)
*F42D 5/045* (2006.01)
*B32B 1/00* (2006.01)

(52) U.S. Cl.
CPC .......... *B64C 11/205* (2013.01); *B64C 27/473* (2013.01); *F41H 5/0471* (2013.01); *F42D 5/045* (2013.01); *B23P 2700/01* (2013.01); *B32B 2262/0269* (2013.01); *B32B 2262/106* (2013.01); *B32B 2307/56* (2013.01); *B32B 2605/18* (2013.01); *B64C 2027/4736* (2013.01); *Y02T 50/433* (2013.01); *Y10T 29/49623* (2015.01)

(58) Field of Classification Search
CPC . B32B 2307/56; B32B 2605/18; B32B 5/245; B64C 11/205; B64C 2027/4736; B64C 27/473; B64C 3/28; F41H 5/0471; F42D 5/045
See application file for complete search history.

(56) References Cited

U.S. PATENT DOCUMENTS

| | | | | |
|---|---|---|---|---|
| 5,624,622 | A * | 4/1997 | Boyce | B29C 44/569 264/258 |
| 5,814,250 | A | 9/1998 | Dudt et al. | |
| 5,939,007 | A * | 8/1999 | Iszczyszyn | B29C 70/32 156/156 |
| 6,779,757 | B2 * | 8/2004 | Thomas, Jr. | B64C 3/28 244/123.1 |
| 8,820,016 | B2 * | 9/2014 | Zhou | E04B 1/762 52/404.2 |
| 2005/0085146 | A1 * | 4/2005 | Farkas | B32B 5/24 442/134 |
| 2007/0272799 | A1 * | 11/2007 | Verdan | B64C 3/28 244/123.6 |
| 2008/0265095 | A1 | 10/2008 | Lee et al. | |
| 2010/0062238 | A1 * | 3/2010 | Doyle | B29C 70/02 428/295.1 |
| 2011/0005382 | A1 | 1/2011 | Farquhar et al. | |
| 2011/0045724 | A1 * | 2/2011 | Bahukudumbi | B32B 5/26 442/57 |
| 2013/0283820 | A1 * | 10/2013 | Muron | F01D 5/282 60/805 |
| 2015/0344125 | A1 * | 12/2015 | Petiot | B64C 1/062 244/133 |

* cited by examiner ature of rear-engined aircraft. It finds applications in particular in the field of the manufacture of turboprop engines and helicopter rotors and also in the field of the manufacture of composite vanes. The invention may also find applications in the production of the leading edge regions of the fixed wing structures of airplanes or rear fuselage.

ENERGY ABSORPTION DEVICE FOR AIRCRAFT STRUCTURAL ELEMENT

RELATED APPLICATIONS

This application is a § 371 application from PCT/EP2013/076754 filed Dec. 16, 2013, which claims priority from French Patent Application No. 12 62896 filed Dec. 27, 2012, each of which is herein incorporated by reference in its entirety.

FIELD OF THE INVENTION

The invention relates to a passive energy absorption device for an aircraft structural element such as a blade, a vane or any other element of a fan, wing structure or fuselage of an aircraft. This energy absorption device is designed to be integrated into a structural element of the aircraft so as to limit the risk of partial detachment or breakup of the structural element in the event of an impact and thus reduce the vulnerability of this structural element to the threat of impact during flight of the aircraft.

The invention also relates to an aircraft rotary structural element comprising such a kinetic energy absorption device. It also relates to a method of integrating this kinetic energy absorption device.

The invention finds applications in the field of aeronautics and notably in the field of rear-engined aircraft. It finds applications in particular in the field of the manufacture of turboprop engines and helicopter rotors and also in the field of the manufacture of composite vanes. The invention may also find applications in the production of the leading edge regions of the fixed wing structures of airplanes or rear fuselage.

BACKGROUND OF THE INVENTION

It is known in the field of aeronautics that rotary structural elements and wing-structure elements are subjected to a high risk of impact from birds, hail, blocks of ice, stones or even pieces of tire or other hard debris encountered by the aircraft in flight, during landing or during takeoff.

The rotary elements associated with the engine or with the mobile wing structure of an aircraft, for example the fans or fan elements such as the vanes and blades of an aircraft, are particularly exposed to dynamic contact generated by birds or other debris encountered by the aircraft. In particular, the composite blades of certain engines are particularly vulnerable. Now, these impacts are very high energy impacts because the impact speed may be as high as 100 m/s. They may therefore prove particularly injurious to the rotary structural elements and, in extreme cases, cause the aircraft to crash.

In the case of aircraft engines with contrarotating fans and rear drive, the engines are generally situated near to the fuselage. Since this type of engine is generally unducted, impact on the rotary elements of the engine may cause an engine element or part of this engine element to detach, with all the consequences that that has for the flight of the aircraft. There is therefore, upon an impact, a high risk of partial or complete detachment of a rotary element of the engine and of a chain reaction of consequences as this detached element re-impacts another rotary element of the engine or an opposite engine, the impact speed for impact on a rear fuselage element then being estimated at 300 m/s.

Aeronautical manufacturers are therefore seeking to minimize as far as possible any partial or complete loss of rotary elements from the engines in the event of an impact by creating rotary structural elements that are able to withstand these impacts.

SUMMARY OF THE INVENTION

It is precisely an object of the invention to overcome the aforementioned disadvantages of the prior art. To this end, the invention proposes an energy absorption device for a structural element of an aircraft, such as an airplane fixed wing structure or blades, vanes or any other rotary element of an airplane or helicopter engine that makes it possible to reduce the threat associated with birdstrike or impact with hard debris.

For that, the invention proposes to integrate, into the structural elements, a device that allows the kinetic energy generated by the impact to be absorbed passively so as to prevent this structural element from breaking up. This energy absorption device comprises an outer casing made of a braided composite material resistant to breakup and a foam core incorporating reinforcing elements made of dry fibers which are capable of dissipating the kinetic energy generated by the impact.

More specifically, the invention relates to a kinetic energy absorption device for an aircraft structural element liable to be subjected to a dynamic impact, characterized in that it comprises:

an outer casing made of braided composite able, after impact, to maintain a degree of integrity, a foam core, contained inside the outer casing and able to fill said outer casing at least partially, said foam core being able at least partially to absorb the kinetic energy generated by the impact, and reinforcing elements comprising at least one preform made of dry composite fibers which is incorporated into the foam core in order, in association with the foam core, to dissipate the kinetic energy generated by the impact.

The kinetic energy absorption device of the invention may have one or more of the following features:

the preform made of dry composite fibers forms a textile (also referred to as fabric) surrounding part of the foam core.

the reinforcing elements comprise several preforms made of dry composite fibers each one forming a textile able to surround part of the foam core so as to partition said foam core.

the dry fibers are made of carbon, aramid and/or PBO, or other.

the outer casing comprises a plurality of plies of impregnated rovings braided with at least two dry fibers.

the reinforcing elements comprise filaments inserted into the foam core by stitching.

the filaments are impregnated with a curable resin.

The invention also relates to an aircraft rotary structural element comprising a leading edge and a trailing edge, characterized in that it comprises a kinetic energy absorption device as described hereinabove, situated in a region of the leading edge.

In addition, the invention relates to a method of integrating a kinetic energy absorption device as described hereinabove, characterized in that it comprises the following operations:

a) manufacturing a block of foam, b) placing a preform made of dry composite fibers around the block of foam, c) arranging an additional layer of foam around the block of foam and the preform made of dry composite fibers in order to form a foam core, and d) installing the outer casing around the foam core obtained in step c).

Steps b) to c) can be repeated by placing other preforms made of dry composite fibers around the foam core obtained in step c).

The method may comprise an operation of stitching filaments into the foam core obtained in step c), this operation being performed prior to step d) of inserting the foam core inside the outer casing.

DETAILED DESCRIPTION OF EMBODIMENTS OF THE INVENTION

The invention proposes a kinetic energy absorption device of the passive type, intended to be integrated into an airplane fixed wing structure, into a fuselage element (for example rear fuselage element) or into a blade, a vane or any other rotary structural element of an airplane or a helicopter. Whether fixed or rotary, the element into which the kinetic energy absorption device is integrated will hereinafter be referred to as structural element. This structural element is intended, on the one hand, to absorb or dissipate the kinetic energy generated by an impact and, on the other hand, to prevent this structural element from breaking up or becoming dislocated so that it maintains its integrity even in the event of an impact.

Figure 1:
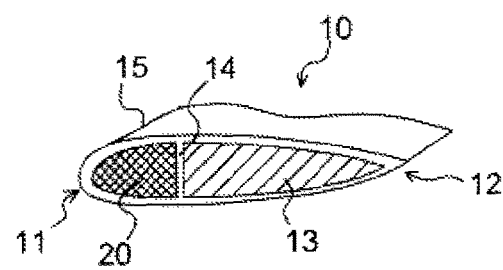
FIG. 1 depicts a view in cross section of one example of an aircraft rotary structural element provided with the energy absorption device of the invention.

One example of a structural element able to accommodate the kinetic energy absorption device of the invention is depicted in FIG. 1. This FIG. 1 shows the example of a blade viewed in cross section. This blade 10 has a shape of oblong cross section with, at the front, a leading edge 11 and, at the rear, a trailing edge 12 opposite the leading edge.

This blade 10 comprises a blade casing 15 inside which a blade body 13 is housed. The blade casing 15 also contains the kinetic energy absorption device 20 of the invention. This kinetic energy absorption device 20 is placed in the region of the leading edge 11 or in any other body of the blade, such as in the blade body 13 for example. Indeed, upon an impact, it is the region of the leading edge 11, situated on the outside of the fan, that is first to take the impact. It is therefore this region 11 that needs to be capable of absorbing the kinetic energy generated by the impact.

In order to ensure unity between the blade body 13 and the kinetic energy absorption device 20, a device/blade body interface 14 is positioned between the kinetic energy absorption device 20 and the blade body 14 and holds the kinetic energy absorption device against the blade body inside the blade casing 15.

It should be noted that FIG. 1 depicts one example of a blade. However, any structural element is formed in a similar way of an element casing, an element body, an interface and the kinetic energy absorption device of the invention. Thus, whatever the structural element considered (blade, vane, fixed wing structure, fuselage, etc.), this element comprises a leading edge in which the kinetic energy absorption device of the invention is housed.

According to the invention, the kinetic energy absorption device comprises a foam core and reinforcing elements housed inside an outer casing. This outer casing of the kinetic energy absorption device may interface with the blade casing 15. The outer casing therefore surrounds the foam core and the reinforcing elements and the blade body 13. In this case, the entirety of the blade casing 15 is made in the same way to interface with the outer casing as will be described later on.

Figure 2A:
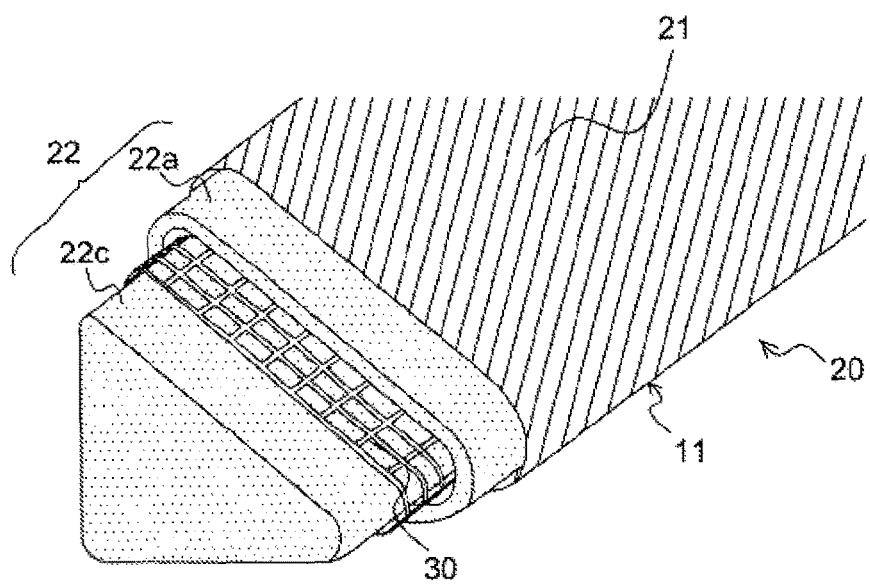
FIGS. 2A and 2B depict the energy absorption device of the invention with its preforms made of dry composite fibers integrated into the foam core.
Figure 2B:
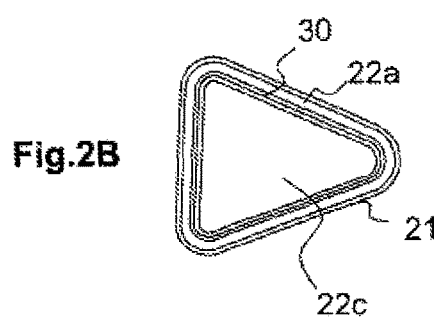

One example of this kinetic energy absorption device is depicted in FIGS. 2A and 2B.

FIG. 2A depicts a partially exploded perspective view of a kinetic energy absorption device according to the invention. FIG. 2B depicts a view in cross section of this same kinetic energy absorption device. These FIGS. 2A and 2B show the kinetic energy absorption device of the invention according to a first embodiment of the reinforcing elements.

The kinetic energy absorption device 20 of the invention comprises an outer casing 21 the role of which is to maintain the integrity of the shape of the structural element as far as possible after an impact. This outer casing 21, which will be described later on, is filled with a foam core 22 the role of which is, on the one hand, to stiffen the outer casing 21 and, on the other hand, to absorb at least some of the kinetic energy generated by the impact.

This foam core 22 comprises within it reinforcing elements 30 which allow the kinetic energy resulting from the impact and which has not been absorbed by the foam core 22 to be dissipated. This dissipation of the kinetic energy by the reinforcing elements 30 is obtained through the rubbing of the dry fibers in the foam core.

The kinetic energy absorption device with its outer casing 21, its foam core 22 and its reinforcing elements 30 is intended to be integrated into an industrial product such as a blade or any other structural element. The kinetic energy absorption device of the invention has therefore to be able to interface with the industrial product in order to provide that product with integrity. Thus the outer casing 21 of the kinetic energy absorption device contains the foam core 22 and the reinforcing elements 30 of the invention, but it may also contain other elements forming part of the industrial product.

The outer casing 21 of the kinetic energy absorption device of the invention forms a sort of cover which surrounds and contains the foam core 22 and the reinforcing elements 30. The assembly is able to dissipate the kinetic energy originating from the impact with contained breakup, making it possible to avoid any risk of generating a chain reaction of impacts. In order to do so, the outer casing 21 needs to be able to achieve a high level of deformation at the moment of impact without losing its integrity. It therefore has to have deformation behavior. According to the invention, the outer casing 21 is made of braided composite materials. In other words, the outer casing 21 constitutes a braid of composite fibers. This braid comprises a plurality of impregnated rovings based on fibrous reinforcement to provide the interface with the blade body or any structural element. It may in particular comprise 2 to 4 plies of impregnated rovings. The braid also comprises layers of the braided and impregnated rovings. In that case, the braid is a 2D braid, which means to say a braid in two dimensions.

The composite braid may also be a 3D braid, namely a braid in three dimensions. In that case, the composite braid comprises, in addition to the 2D braid, a reinforcement in thickness. The meshing of the braid is therefore more dense and contributes to absorbing energy.

Whatever the type of braid, 2D or 3D, the fibers of which this braid is formed may be either carbon fibers, aramid fibers, aramid rovings braided with carbon or alternatively PBO (polyphenylene-2,6-benzobisoxazole) fibers or other. Carbon fiber has the advantage of being rigid and easy to break, offering dissipation by breakage even when the carbon fiber is in the outer casing. A braid of fibers also allows energy to be dissipated by the rubbing of the fibers together.

Aramid has the advantage of being a more flexible material which deforms. Aramid fibers deform. An aramid braid therefore has the advantage of following the deformation of the foam core and also allows the energy to be dissipated by friction rubbing.

It will therefore be appreciated that braiding carbon fibers with aramid fibers may bring with it the advantage of dissipation by breakage associated with dissipation by rubbing or deformation of the product. In other words, in a configuration involving aramid, the aramid will provide the ability to deform and guarantee that the device holds together during impact. In the configuration of a carbon-aramid hybrid casing, the carbon contributes to reducing the depth of impact and to dissipating the kinetic energy through the breakage of the fibers.

The foam core of the structural element of the invention is made of a foam that may have varying degrees of density. Whatever its density, the purpose of the foam is to at least partially fill the outer casing and give it stiffness. It also allows the reinforcing elements 30 to be held in place.

The density of the foam may vary between 50 kg/m3 and 200 kg/m3. A higher-density foam has the advantage of absorbing a greater amount of kinetic energy. A lower-density foam has the advantage of lightening the kinetic energy absorption device as a whole, which corresponds to the ever-present desire in aeronautics to reduce the overall mass of the aircraft. Furthermore, a lower-density foam has the advantage that it can be injected, which allows for easier incorporation of the reinforcing elements. Whatever its density, the foam guarantees that the kinetic energy absorption device remains stable during operation.

This foam may or may not have a hollow shape. In other words, the foam core may have a hollow center. The foam then merely forms an interface with the outer casing in order to give the casing rigidity.

The foam core 22 is provided with reinforcing elements 30 which allow the kinetic energy from the impact to be dissipated. According to the invention, these reinforcing elements 30 comprise at least one preform made of dry composite fibers which is integrated into the foam core. This preform made of dry composite fibers takes the form of a textile or fabric, which may or may not be open mesh, forming a kind of net around a portion of the foam core referred to as block of foam.

It is known practice in the field of aeronautics not to use dry composite fibers in the manufacture of aircraft because dry composite fibers have no integrity, which means to say that they do not remain in position without a binder between them. Preimpregnated composite fibers are generally used. However, in the invention, it has been found that dry composite fibers could be encapsulated, which means to say integrated within a foam core (for more specific requirements, the foam may be replaced by an elastomeric material with a high shock-absorption capability), and modify the behavior of the assembly formed with the foam core. Indeed, under the effect of an impact, encapsulated dry composite fibers cause within the foam core a degree of friction that is capable of absorbing at least some of the kinetic energy generated by the impact. These dry composite fibers thus allow, by rubbing, an energy absorption that could not be obtained with impregnated composite fibers.

According to the invention, the preform made of dry composite fibers is placed around a block of foam and the assembly made up of the block of foam and of the preform made of dry composite fibers is integrated into a mold with a complementary portion of foam. The preform made of dry composite fibers thus finds itself encapsulated in the foam core. FIGS. 2A and 2B show a kinetic energy absorption device 20 with a preform made of dry composite fibers 30 encapsulated in the foam core 22. These figures notably show the block of foam 22c surrounded by the preform made of dry composite fibers 30, which is itself surrounded by a layer of foam 22a. The assembly of the foam core 22 (made up of the block of foam 22c and of the layer of foam 22a) and of the preform made of dry composite fibers 30 is surrounded by the outer casing 21 in order to form the kinetic energy absorption device 20.

Figure 3A:
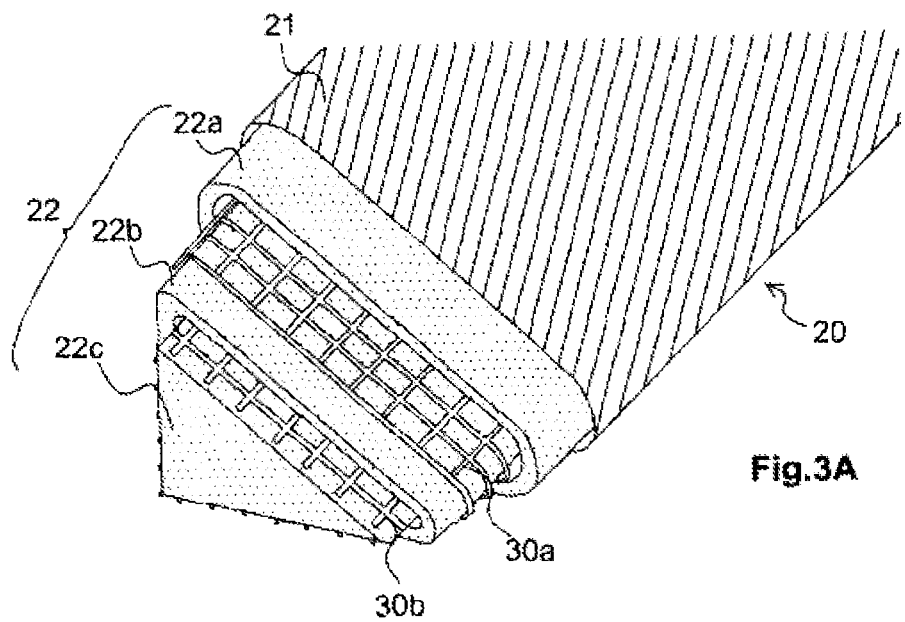
FIGS. 3A and 3B depict the energy absorption device of the invention with two layers of preforms made of dry composite fibers integrated into the foam core.
Figure 3B:
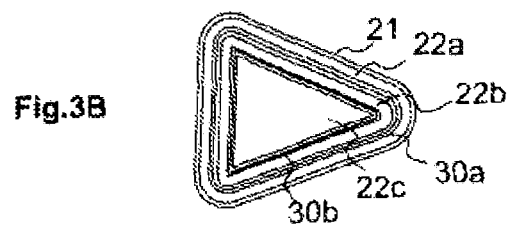

In one embodiment of the invention, several preforms are encapsulated in one and the same foam core. One illustration of this embodiment is given in FIGS. 3A and 3B. As may be seen in these figures, several preforms made of dry composite fibers 30a, 30b are inserted within the same foam core 22. In this embodiment, a first preform made of dry composite fibers 30b surrounds a block of foam 22c. A first layer of foam 22b surrounds the first preform 30b and the block of foam 22c. A second preform made of dry composite fibers 30a surrounds this second layer of foam 22b. A third layer of foam 22a surrounds the assembly made up of the second preform made of dry composite fibers 30b, the second layer of foam 22b, the first preform made of dry composite fibers 30b and the block of foam 22c, all of that being finally surrounded by the outer casing 21.

It will be appreciated from these FIGS. 2A, 2B, 3A and 3B that the kinetic energy absorption device of the invention can be manufactured as follows:

a) manufacture of a block of foam,
b) installation of a preform made of dry composite fibers around said block of foam,
c) integration of an additional layer of foam around the block of foam surrounded by the preform made of dry composite fibers in order to form the foam core, and
d) installation of the outer casing around the foam core with its preform made of dry composite fibers.

When several preforms made of dry composite fibers are encapsulated in the foam core, then steps b) to c) are repeated, placing a second preform made of dry composite fibers around the foam core obtained in step c). It should be noted that several preforms made of dry composite fibers may be encapsulated in the foam core by installing preforms made of dry composite fibers and integrating layers of foam in succession. The various preforms made of dry composite fibers are then parallel to one another within the foam core.

Figure 4:
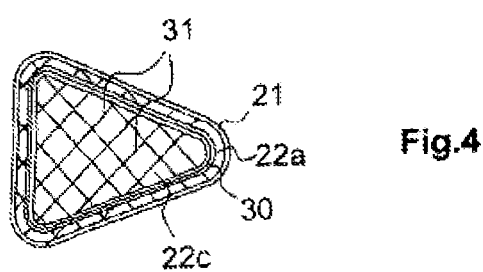
FIG. 4 depicts an alternative form of the energy absorption device of FIGS. 3A and 3B.

In one alternative form of the invention, the reinforcing elements 30 described hereinabove may be supplemented by reinforcing filaments 31 stitched through the foam core. One example of a foam core 22 with a preform made of dry composite fibers 30 and reinforcing filaments 31 is depicted in FIG. 4. These reinforcing filaments 31 are continuous or discontinuous, relatively flexible carbon filaments stitched at regular or irregular intervals into the foam core. These carbon filaments 31 are impregnated with a curable resin. Thus, upon impact, these reinforcing filaments 31 are able, by breaking, to dissipate some of the kinetic energy generated by the impact.

It will be appreciated that the tension in a filament differs according to whether it is continuous or discontinuous. In the case of a continuous filament, damage occurs by the breaking of the filament. In the case of discontinuous filaments, damage may occur either through the slippage of the filament in the foam or through breakage. However, whatever their break points, each breakage of a filament 31 dissipates some of the kinetic energy.

These reinforcing filaments 31 may be stitched parallel into the foam core, directed longitudinally with respect to the leading edge 11. They may also be stitched in two mutually perpendicular directions or other directions in order to form a grid pattern, as shown in FIG. 4. In that case, their breakage allows kinetic energy to be dissipated at various angles of incidence.

In order to manufacture a kinetic energy absorption device according to this alternative form, the method of manufacture needs to comprise an additional operation, between step c) and step d), of stitching the filaments into the foam core.

All the embodiments and alternative forms described hereinabove allow for a mechanism for progressively triggering the dissipation of kinetic energy. In this way, the foam core is destroyed more or less according to the kinetic energy developed during the impact.

The invention claimed is:

1. A kinetic energy absorption device for a structural element of an aircraft subjected to a dynamic impact, the aircraft comprises a leading edge and a trailing edge, the device comprising:
    an outer casing made of a braided composite maintaining an integrity after an impact, said braided composite comprising at least two dry fibers;
    a foam core contained inside the outer casing and at least partially filling the outer casing, the foam core configured to at least partially absorb kinetic energy generated by the impact;
    reinforcing elements comprising at least one preform made of dry composite fibers, the reinforcing elements in association with the foam core dissipate the kinetic energy generated by the impact, said at least one preform is incorporated into the foam core; and
    the kinetic energy absorption device is situated in a region of the leading edge.

2. The kinetic energy absorption device as claimed in claim 1, wherein the dry composite fibers are made of at least one of the following: carbon, aramid or polyphenylene-2,6-benzoisoxazole.

3. The kinetic energy absorption device as claimed in claim 1, wherein the outer casing comprises a plurality of plies of impregnated rovings braided with at least two dry fibers.

4. The kinetic energy absorption device as claimed in claim 1, wherein the kinetic energy generated by the impact is dissipated through rubbing of said at least two dry fibers of the braided composite.

5. The kinetic energy absorption device as claimed in claim 1, wherein said at least one preform made of dry composite fibers forms a fabric surrounding part of the foam core.

6. The kinetic energy absorption device as claimed in claim 5, wherein the reinforcing elements comprise a plurality of preforms made of dry composite fibers, each preform forming a fabric surrounding a part of the foam core to partition the foam core.

7. The kinetic energy absorption device as claimed in claim 1, wherein the reinforcing elements comprise filaments inserted into the foam core by stitching.

8. The kinetic energy absorption device as claimed in claim 7, wherein the filaments are impregnated with a curable resin.

9. A method of integrating a kinetic energy absorption device for a structural element of an aircraft subjected to a dynamic impact, the aircraft comprises a leading edge and a trailing edge, the method comprising the steps of:
    manufacturing a block of foam,
    placing a preform made of dry composite fibers around the block of foam;
    integrating an additional layer of foam around the block of foam and the preform form a foam core of the kinetic energy absorption device, the foam core is configured to at least partially absorb and dissipate kinetic energy generated by an impact;
    installing an outer casing of the kinetic energy absorption device around the foam core, the outer casing made of a braided composite maintaining an integrity after the impact, said braided composite comprising at least two dry fibers;
    situating the kinetic energy absorption device in a region of the leading edge; and
    wherein the kinetic energy generated by the impact is dissipated through rubbing of said at least two dry fibers of the braided composite.

10. The method of integrating the kinetic energy absorption device as claimed in claim 9, further comprising the step of repeating the steps of placing and integrating to obtain a second preform made of dry composite fibers around the foam core.

11. The method of integrating the kinetic energy absorption device as claimed in claim 9, further comprising the step of stitching filaments into the foam core before installing the outer casing.

* * * * *